United States Patent
Yang

(10) Patent No.: US 10,359,056 B2
(45) Date of Patent: Jul. 23, 2019

(54) ENERGY STORAGE STRUCTURE

(71) Applicant: Fugang Yang, Chongqing (CN)

(72) Inventor: Fugang Yang, Chongqing (CN)

( * ) Notice: Subject to any disclaimer, the term of this patent is extended or adjusted under 35 U.S.C. 154(b) by 191 days.

(21) Appl. No.: 15/406,469

(22) Filed: Jan. 13, 2017

(65) Prior Publication Data

US 2018/0106275 A1    Apr. 19, 2018

(30) Foreign Application Priority Data

Oct. 18, 2016   (CN) .......................... 2016 1 0905137

(51) Int. Cl.
| | |
|---|---|
| *F15B 1/02* | (2006.01) |
| *F15B 15/00* | (2006.01) |
| *F15B 15/06* | (2006.01) |
| *F17C 1/00* | (2006.01) |
| *F02C 6/16* | (2006.01) |
| *F16F 9/00* | (2006.01) |

(52) U.S. Cl.
CPC ............... *F15B 1/021* (2013.01); *F02C 6/16* (2013.01); *F15B 15/00* (2013.01); *F15B 15/065* (2013.01); *F16F 9/00* (2013.01); *F17C 1/00* (2013.01); *F17C 2201/019* (2013.01); *F17C 2221/013* (2013.01); *F17C 2221/014* (2013.01); *F17C 2221/033* (2013.01); *F17C 2221/035* (2013.01); *F17C 2223/013* (2013.01); *F17C 2223/0115* (2013.01); *F17C 2223/0123* (2013.01); *Y02E 60/15* (2013.01)

(58) Field of Classification Search
CPC ............... F15B 1/033; F15B 1/08; F15B 1/24
USPC ........................................................ 60/413
See application file for complete search history.

(56) References Cited

FOREIGN PATENT DOCUMENTS

| CN | 102840185 | * | 5/2011 | |
| CN | 102767586 | * | 11/2012 | ................ F16F 9/53 |

OTHER PUBLICATIONS

Machine Translation of CN102767586.*
Machine Translation of CN102840185.*

* cited by examiner

*Primary Examiner* — F Daniel Lopez
*Assistant Examiner* — Daniel S Collins
(74) *Attorney, Agent, or Firm* — Renaissance IP Law Group, LLP; David A. Crowther

(57) ABSTRACT

Provided is an energy storage structure, comprising a housing and a piston. An accommodating cavity and a piston cylinder part communicating with each other are arranged within the housing. The piston is slidably and sealingly arranged within the piston cylinder part for transferring impact energy. A self-pressure of an energy storage medium, arranged within the accommodating cavity and the piston cylinder part, acts on the piston, tending to push the piston to move. An energy storage structure provided by the present invention has a simple structure, is convenient for use, and can ensure that a thrust or impact force remains unchanged or slightly changes during operation, to achieve stable release of potential energy. Moreover, the adjustment of the thrust or impact force can be achieved by changing the temperature of the energy storage medium in the accommodating cavity, thereby achieving change in total impact energy of the energy storage structure.

16 Claims, 4 Drawing Sheets ical problems existing in the prior art, such as during operation, the thrust of the energy storage structure is continuously varying while the intensity of impact energy cannot be changed.

ENERGY STORAGE STRUCTURE

RELATED APPLICATION DATA

This application claims priority under 35 USC § 119 to Chinese Patent Application No. 201610905137.0, filed on Oct. 18, 2016 in the State Intellectual Property Office (SIPO) of the People's Republic of China, the contents of which are herein incorporated by reference in their entirety.

TECHNICAL FIELD

Embodiments of the present invention relate to energy storage devices, and more particularly, to an energy storage structure, which stores energy by an inter-conversion between a liquid state and a gas state of an energy storage medium.

BACKGROUND

There are generally two kinds of energy storage structures currently available in the market, one that stores energy by using a spring, and the other that stores energy by using a compressed gas. Both the modes have a common characteristic in that during operation, a thrust applied to a piston varies with the position of the piston, i.e., the thrust is maximum at an initial position thereof, and the thrust is minimum at a final position thereof. In other words, the thrust from the above energy storage structure gradually decreases as the stored potential energy is gradually released. Conversely, the thrust from the energy storage structure gradually increases as the stored potential energy is increased during energy storage.

Both the structures have a large contour dimension, and after being shaped, intensity of impact energy each time is invariable, i.e., a constant value.

SUMMARY

Embodiments of the present invention provide an energy storage structure, which stores energy by an inter-conversion between a liquid state and a gas state of an energy storage medium, and changes intensity of impact energy by changing the temperature of the energy storage medium, to solve technical problems existing in the prior art, such as during operation, the thrust of the energy storage structure is continuously varying while the intensity of impact energy cannot be changed.

Embodiments of the present invention provide an energy storage structure, comprising a housing and a piston. An accommodating cavity and a piston cylinder part communicating with each other may be arranged within the housing. The piston is slidably and sealingly arranged within the piston cylinder part for transmission of impact energy. An energy storage medium is arranged within the accommodating cavity. A self-pressure of the energy storage medium acts on the piston, tending to push the piston to move.

Further, the energy storage medium may be one selected from a group including hydrocarbon substances and mixtures thereof.

Further, the energy storage medium may be one of the following, or a mixture of several of the following: carbon dioxide ($CO_2$), nitrogen gas ($N_2$), nitrous oxide ($N_2O$), ethylene ($C_2H_4$), propylene ($C_3H_6$), trifluoromethane ($CHF_3$), ammonia gas ($NH_3$), methane ($CH_4$), propane ($C_3H_8$), and so on.

When the accommodating cavity and the piston cylinder part accommodates therein enough liquid-state energy storage medium, during sliding of the piston, the total volume of the accommodating cavity and the piston cylinder part is changed, the energy storage medium is inter-converted between a liquid state and a gas state, while the pressure of the energy storage medium is always at a saturated vapor pressure, such that a thrust exerted by the energy storage medium on the piston always remains constant.

Further, the temperature in the accommodating cavity is lower than a critical temperature at a gas-liquid conversion critical point of the energy storage medium.

Further, a value of a pressure in the accommodating cavity is equal to a saturated vapor pressure of the energy storage medium.

Further, the energy storage medium is in a liquid state, in a mixed state of gas and liquid, or in a gas state at a saturated vapor pressure; and by moving the piston, accommodating volumes of the accommodating cavity and the piston cylinder part is changed, and the ratio between liquid and gas states of the energy storage medium is changed.

Further, the energy storage medium in the accommodating cavity is a supercritical fluid. A density of the energy storage medium is changed when the accommodating volume in the accommodating cavity is changed.

Further, the temperature in the accommodating cavity is higher than a critical temperature at a gas-liquid conversion critical point of the energy storage medium. The value of the pressure in the accommodating cavity is larger than a critical pressure at the gas-liquid conversion critical point of the energy storage medium.

When the energy storage medium in the accommodating cavity is in a supercritical state, the energy storage medium is a gaseous fluid, and when an external acting force pushes the piston to move, the energy storage medium is compressed, and the energy storage medium has a relative large change in density and a very small change in pressure intensity, so as to achieve a very small change in the thrust exerted by the energy storage medium on the piston during the movement of the piston.

Further, a sealing ring is arranged between the piston cylinder part and the piston for sealing therebetween.

Further, at least one heating element for heating the energy storage medium is arranged within the accommodating cavity.

The heating element is used to heat the energy storage medium in the accommodating cavity, thereby changing the temperature of the energy storage medium so as to change the saturated vapor pressure of the energy storage medium in the accommodating cavity. The higher the temperature of the medium is, the larger the saturated vapor pressure of the energy storage medium is—that is, the larger the thrust acting on the piston is, and the larger the finally obtained impact energy is. Conversely, the lower the temperature of the medium is, the smaller the saturated vapor pressure of the energy storage medium is—that is, the smaller the thrust acting on the piston is, and the smaller the finally obtained impact energy is.

Further, at least one temperature sensor and/or pressure sensor may be arranged within the accommodating cavity.

Further, the housing may be provided with a safety valve on a side wall of the accommodating cavity.

Further, the housing may be provided with a feeding hole from which the energy storage medium is fed into the accommodating cavity, and the feeding hole may be provided with a valve.

Further, the accommodating cavity may be an annular cavity enclosing the piston cylinder part.

Further, the piston cylinder part communicates with the accommodating cavity through a pipeline.

Further, the energy storage structure further comprises a return mechanism connected to the piston and configured to make the piston return to an initial position.

Further, a piston rod is arranged at one end of the piston, and the piston rod is connected with the return mechanism.

An energy storage structure provided by embodiments of the present invention is convenient to use, and can ensure that a thrust or impact force remains unchanged or slightly changed during operation, so as to achieve stable release of potential energy. Moreover, the adjustment of the thrust or impact force can be achieved by changing the temperature of the energy storage medium in the accommodating cavity, thereby achieving a change in total impact energy of the energy storage structure.

BRIEF DESCRIPTION OF THE DRAWINGS

In order to explain the technical solutions of the specific embodiments of the present invention or of the prior art more clearly, the following drawings will be introduced briefly below. The drawings described below are merely illustrative of some embodiments of the present invention, and those skilled in the art can also obtain, from these drawings, other drawings without inventive efforts.

Figure 1:
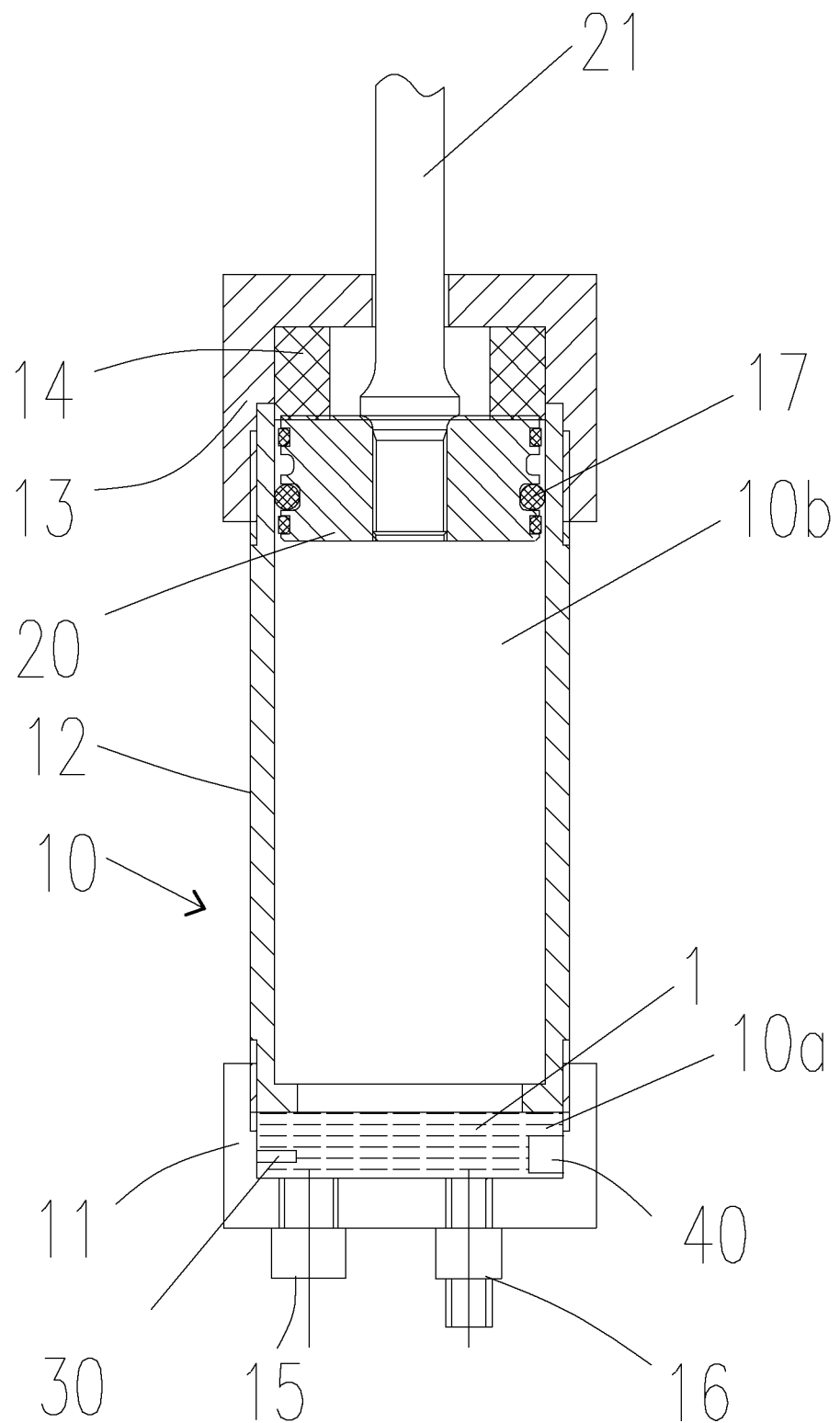
FIG. 1 is a structural schematic view of an energy storage structure provided by an embodiment of the present invention.

Reference numerals:

| | |
|---|---|
| 1-energy storage medium; | 10-housing; |
| 10a-accommodating cavity; | 10b-piston cylinder part; |
| 11-lower cover body; | |
| 12-cylinder body; | 13-upper cover body; |
| 14-cushion; | 15-safety valve; |
| 16-valve; | 17-sealing ring; |
| 20-piston; | 21-piston rod; |
| 30-heating element; | 40-temperature and/or pressure sensor; |
| 50-return mechanism. | |

DETAILED DESCRIPTION OF THE EMBODIMENTS

The technical solutions of the present invention will be described below clearly and fully with reference to the figures. It is apparent that the embodiments to be described are some, but not all of the embodiments of the present invention. All the other embodiments obtained by those skilled in the art from the embodiments of the present invention without inventive efforts will fall within the scope of the present invention as claimed.

In the description of the various embodiments of the present invention, it should be indicated that orientation or positional relations indicated by terms such as "center," "up," "down," "left," "right," "vertical," "horizontal," "inside," and "outside" are the orientation or positional relations shown based on the figures, only for facilitating description of the present invention and simplifying the description, rather than indicating or implying that the referred devices or elements must be in a particular orientation or constructed or operated in the particular orientation, and therefore they should not be construed as limiting the present invention. In addition, terms such as "first," "second," and "third" are used only for description, and should not be understood as indicating or implying to have importance in relativity.

In the description of the various embodiments of the present invention, it should be indicated that unless otherwise expressly specified or defined, terms "mount," "couple," and "connect," should be understood broadly, and for example, a connection may be a fixed connection, or a detachable connection, or an integrated connection; a connection may be a mechanical connection or an electric connection; a connection may be a direct connection, or an indirect connection via an intermediate medium, or may be an internal communication between two elements. The specific meanings of the above-mentioned terms as used herein could be understood by those skilled in the art according to specific situations.

Embodiments of the present invention will be further explicated and explained hereinafter with reference to specific embodiments.

Figure 2:
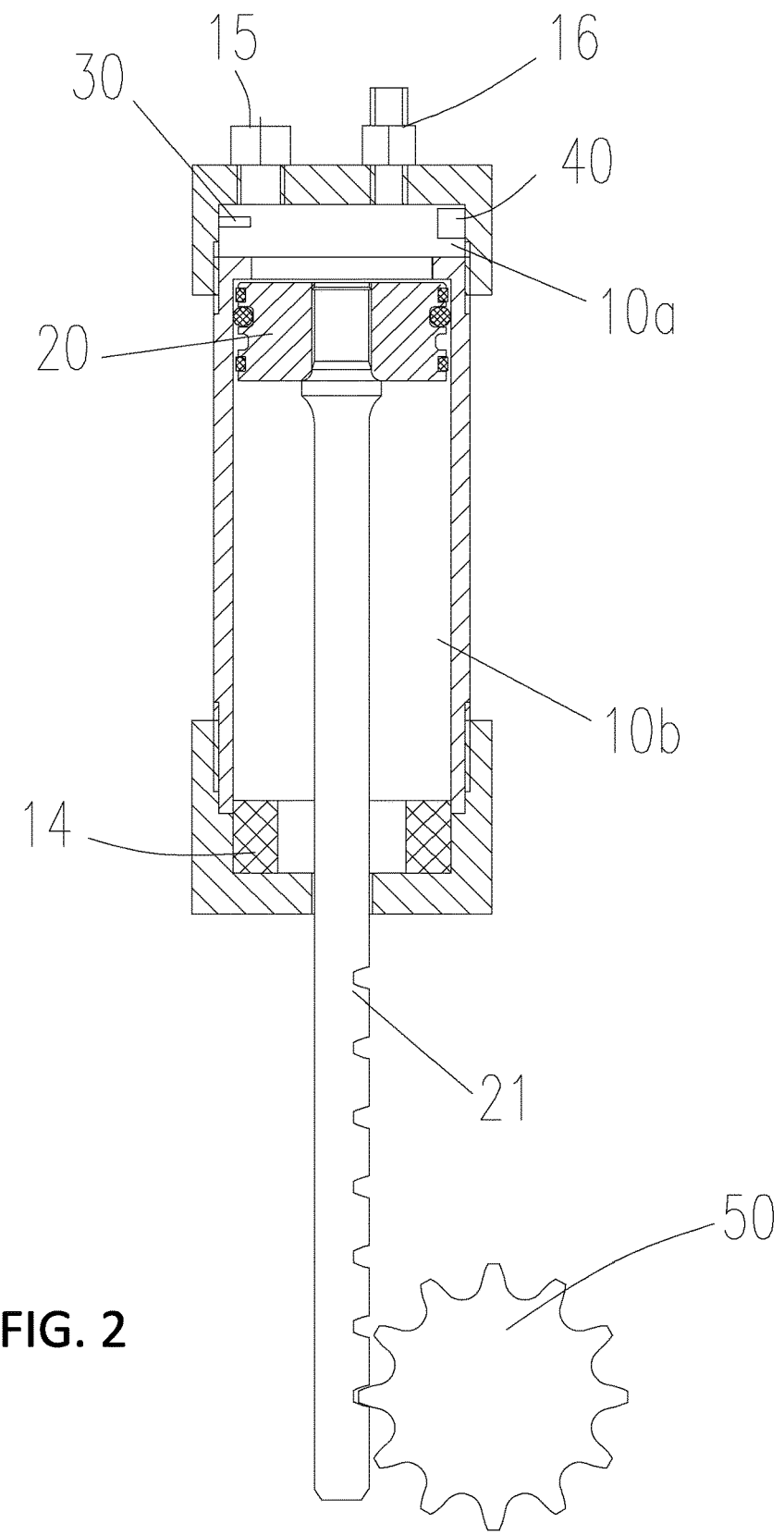
FIG. 2 is a structural schematic view of the energy storage structure shown in FIG. 1 when being compressed to store energy.
Figure 3:
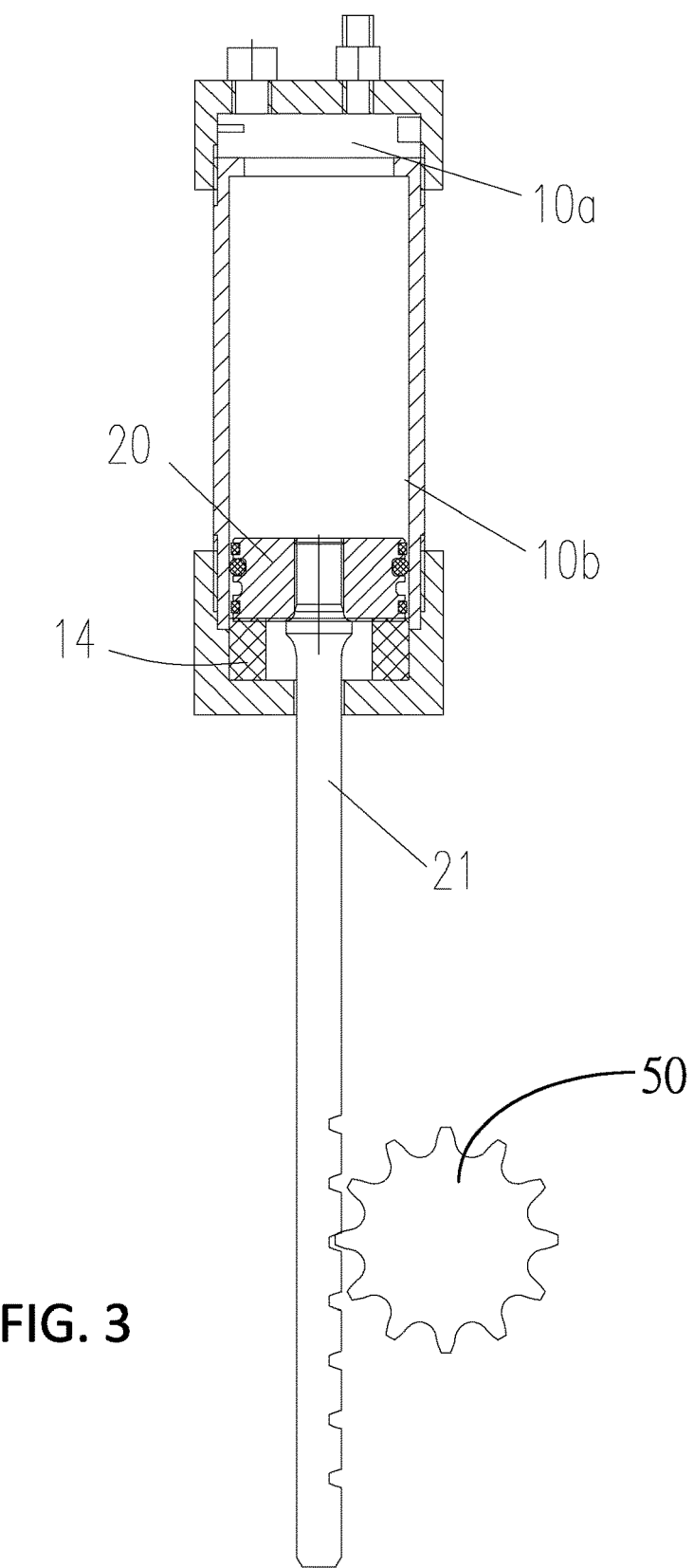
FIG. 3 is a structural schematic view of the energy storage structure shown in FIG. 1 when releasing the stored energy.

As shown in FIGS. 1-3, an energy storage structure provided by the present embodiment comprises a housing 10 and a piston 20, an accommodating cavity 10a, and a piston cylinder part 10b communicating with each other, and which are arranged within the housing 10. The piston 20 is slidably and sealingly arranged within the piston cylinder part 10b for transmission of impact energy. An energy storage medium 1 is arranged within the accommodating cavity 10a and the piston cylinder part 10b. A self-pressure of the energy storage medium 1 acts on the piston 20, tending to push the piston 20 to move.

Here, the energy storage medium 1 is preferably a hydrocarbon substance or a mixture thereof, such as propylene (C3H6), propane (C3H8), or the like. The value of a pressure in the accommodating cavity 10a is equal to a saturated vapor pressure of the energy storage medium 1.

When the piston 20 moves in the accommodating cavity 10a, the energy storage medium 1 is inter-converted between a liquid state and a gas state. The gaseous energy medium 1 may always be in a saturated vapor pressure state, and a thrust exerted by the gaseous energy medium 1 on the piston 20 may always remain substantially constant.

The energy storage medium 1 may be in a liquid state, in a mixed state of gas and liquid, or in a gas state at a saturated vapor pressure. The ratio between liquid and gas states of the energy storage medium 1 is changed as the piston 20 moves.

A sealing ring 17 is arranged between the piston cylinder part 10b and the piston 20 for sealing therebetween.

At least one heating element 30 for heating the energy storage medium 1 is arranged within the accommodating cavity 10a.

The heating element 30 is used to heat the energy storage medium 1 in the accommodating cavity 10a, thereby changing the saturated vapor pressure of the energy storage medium 1 in the accommodating cavity by changing the temperature of the energy storage medium 1. The higher the temperature of the medium is, the larger the saturated vapor pressure of the energy storage medium 1 is—that is, the larger the thrust acting on the piston 20 is, and the larger the finally obtained impact energy is. Conversely, the lower the temperature of the medium is, the smaller the saturated vapor pressure of the energy storage medium 1 is—that is, the smaller the thrust acting on the piston 20 is, and the smaller the finally obtained impact energy is.

At least one pressure sensor and/or temperature sensor 40 may be arranged within the accommodating cavity 10a. The heating element 30 may adjust the heat of the energy storage medium 1 in the accommodating cavity 10a responsive to at least one of the pressure sensor or temperature sensor 40.

The housing 10 may be provided with a safety valve 15 on a side wall of the accommodating cavity 10a.

The housing 10 may be provided, on a side wall of the accommodating cavity 10a, with a feeding hole from which the energy storage medium 1 is fed or discharged. The feeding hole may be provided with a valve 16.

The accommodating cavity 10a and the piston cylinder part 10b may be formed integrally, or may also be formed separately and communicate through a pipeline.

As shown in FIG. 1, the housing 10 is composed of a cylinder body 12, an upper cover body 13 and a lower cover body 11, all of which may be sealed and connected by screw thread, for example. The piston cylinder part 10b is arranged within the cylinder body 12, and a piston 20 is slidably and sealingly arranged within the piston cylinder part 10b.

The accommodating cavity 10a, in which a liquid-state energy storage medium 1 may be stored, is arranged within the lower cover body 11.

A cushion 14 for cushioning of the piston 20 is arranged within the upper cover body 13. The cushion 14 performs a function of cushioning and shock-absorbing when the piston 20 moves to the upper end.

The housing 10 may be in various forms and can be arranged freely according to the space in practical applications.

Figure 4:
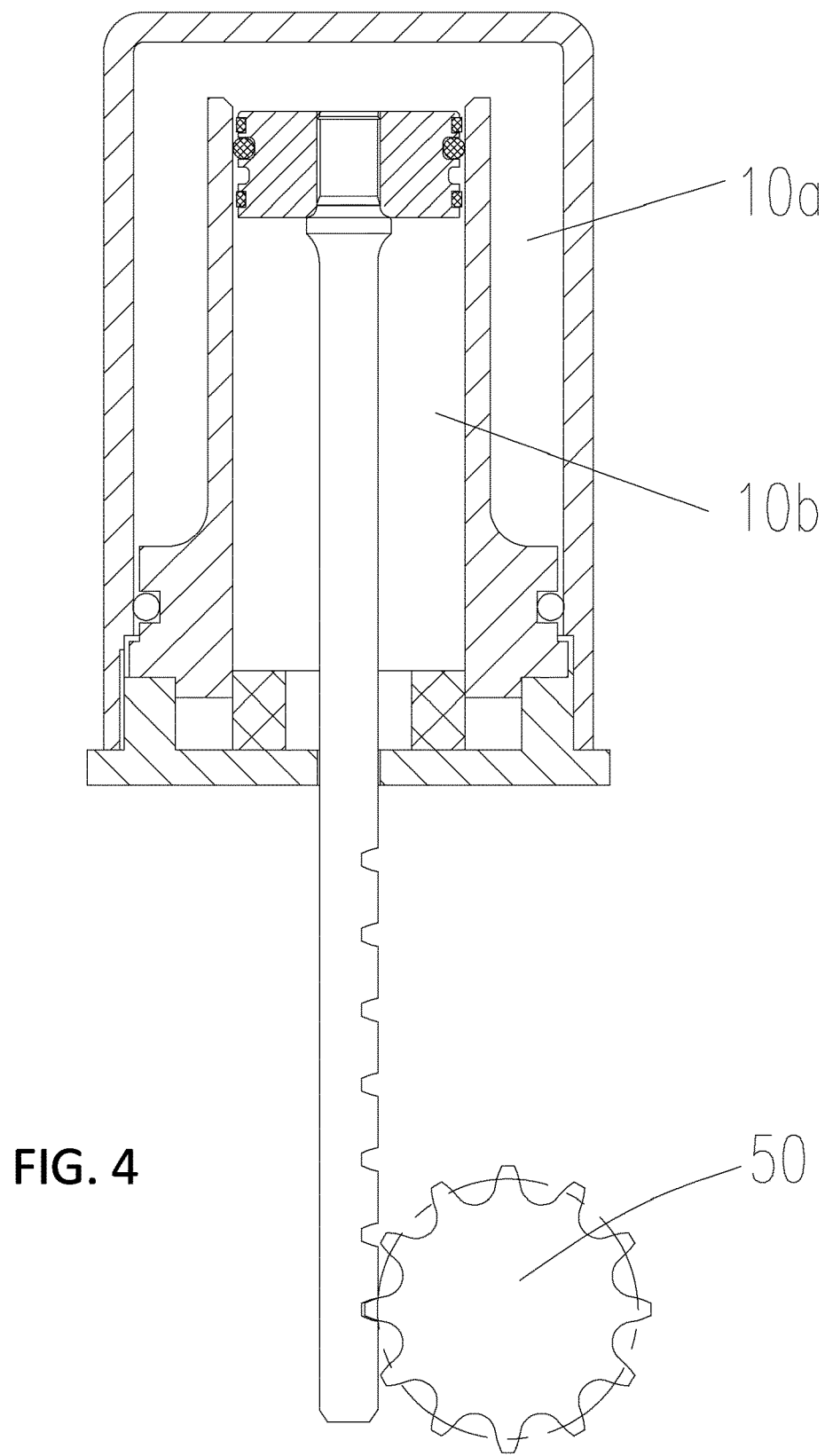
FIG. 4 is a structural schematic view of another implementation of a housing of the energy storage structure provided by an embodiment of the present invention.

As shown in FIG. 4, the housing 10 may be composed of a central cylinder body and a barrel-like body covering externally the cylinder body. The piston cylinder part 10b is arranged within the central cylinder body, and the accommodating cavity 10a may be an annular cavity enclosing the piston cylinder part 10b.

As shown in FIGS. 2 and 3, the energy storage structure further comprises a return mechanism 50 connected to the piston 20 and configured to make the piston 20 return to an initial position. For example, an initial position may be shown in FIG. 2, with a subsequent position shown in FIG. 3. Therefore, the return mechanism 50 can cause the piston 20 to return to the initial position as shown in FIG. 2. Accordingly, the piston 20 can oscillate between the initial position shown in FIG. 2 and the subsequent position shown in FIG. 3. The return mechanism 50 tends to force the piston 20 to move so as to decrease an accommodating volume in the accommodating cavity 10a.

A piston rod 21 is arranged at one end of the piston 20. The piston rod 21 and the return mechanism 50 are connected by a gear mechanism. That is to say, the piston rod 21 is provided thereon with a straight tooth structure, and the return mechanism 50 is provided thereon with a gear engaging with the straight tooth structure. The return mechanism 50 drives the piston 20 to return to the initial position by the gear.

An energy storage structure provided by embodiments of the present invention is convenient to use, and can ensure that a thrust or impact force remains unchanged or slightly changes during the operation, so as to achieve stable release of potential energy. Moreover, the adjustment of the thrust or impact force can be achieved by changing the temperature of the energy storage medium in the accommodating cavity, thereby achieving a change in total impact energy of the energy storage structure.

In some embodiments, an energy storage structure is provided including a housing and an accommodating cavity and a piston cylinder part arranged within the housing, wherein the accommodating cavity and the piston cylinder part are configured to communicate with each other. The energy storage structure may include a piston slidably arranged within the piston cylinder part, wherein the piston is configured to transmit impact energy. The energy storage structure may include a sealing ring arranged between the piston cylinder part and the piston and configured to seal the piston cylinder part and the piston therebetween. The energy storage structure may include an energy storage medium arranged within the accommodating cavity, wherein a self-pressure of the energy storage medium is configured to act on the piston to push and move the piston.

In some embodiments, the energy storage medium is always in a saturated vapor pressure state, a ratio between liquid and gas states of the energy storage medium is configured to change as the piston moves, and a thrust exerted by the piston dependent on the energy storage medium in the saturated vapor pressure state remains substantially constant.

In some embodiments, the energy storage medium in the accommodating cavity is a supercritical fluid, and a density of the energy storage medium is configured to change responsive to a change in an accommodating volume in the accommodating cavity.

The energy storage structure may include at least one heating element configured to heat the energy storage medium arranged within the accommodating cavity, at least one temperature sensor arranged within the accommodating cavity, and at least one pressure sensor arranged within the accommodating cavity.

In some embodiments, the accommodating cavity includes an annular cavity enclosing the piston cylinder part.

The energy storage structure may include a piston rod including a plurality of teeth, and a return mechanism connected to the piston rod and configured to cause the piston to return to an initial position.

In some embodiments, the return mechanism includes a gear mechanism. In some embodiments, the gear mechanism is configured to engage with the plurality of teeth of the piston rod. In some embodiments the return mechanism is configured to drive the piston to return the piston to the initial position by the gear mechanism.

According to an embodiment of the invention, an energy storage structure may include a housing and a piston, wherein an accommodating cavity and a piston cylinder part communicating with each other are arranged within the housing.

In some embodiments, the piston is slidably and sealingly arranged within the piston cylinder part for transmission of impact energy.

In some embodiments, an energy storage medium is arranged within the accommodating cavity.

In some embodiments, a self-pressure of the energy storage medium is configured to act on the piston, to push and move the piston.

In some embodiments, value of a pressure in the accommodating cavity is equal to a saturated vapor pressure of the energy storage medium.

In some embodiments, the energy storage medium in the accommodating cavity is a supercritical fluid.

In some embodiments, a density of the energy storage medium is configured to change when an accommodating volume in the accommodating cavity is changed.

The energy storage structure may include at least one heating element configured to heat the energy storage medium arranged within the accommodating cavity. The energy storage structure may include at least one temperature sensor arranged within the accommodating cavity. The energy storage structure may include at least one pressure sensor arranged within the accommodating cavity.

In some embodiments, the accommodating cavity includes an annular cavity enclosing the piston cylinder part.

In some embodiments, the piston cylinder part is configured to communicate with the accommodating cavity through a pipeline.

The energy storage structure may include a return mechanism connected to the piston and configured to make the piston return to an initial position.

In some embodiments, the energy storage medium is a hydrocarbon substance.

In some embodiments, the energy storage medium is a mixture of two or more hydrocarbon substances.

In some embodiments, the energy storage medium includes at least one of carbon dioxide, nitrogen gas, nitrous oxide, ethylene, propylene, trifluoromethane, ammonia gas, methane, or propane.

In some embodiments, the energy storage medium includes a mixture of at least two of carbon dioxide, nitrogen gas, nitrous oxide, ethylene, propylene, trifluoromethane, ammonia gas, methane, or propane.

It should be indicated that the above embodiments are merely intended to explain technical solutions of the various embodiments of the present invention and are not intended to limit the present invention. Although embodiments of the present invention have been explained in detail with reference to the foregoing embodiments, it will be understood by those skilled in the art that the technical solutions described in the foregoing embodiments can still be modified, or some or all of the technical features thereof can be substituted by equivalent alternatives, and these modifications or substitutions do not make the principle of the corresponding technical solutions depart from the scope of the technical solutions of the embodiments of the present invention.

The invention claimed is:

1. An energy storage structure, comprising:
   a housing;
   an accommodating cavity and a piston cylinder part arranged within the housing, wherein the accommodating cavity and the piston cylinder part are configured to communicate with each other;
   a piston slidably arranged within the piston cylinder part, wherein the piston is configured to transmit impact energy;
   a sealing ring arranged between the piston cylinder part and the piston and configured to seal the piston cylinder part and the piston therebetween; and
   an energy storage medium arranged within the accommodating cavity, wherein a self-pressure of the energy storage medium is configured to act on the piston to push and move the piston,
   wherein the energy storage medium is always in a saturated vapor pressure state, a ratio between liquid and gas states of the energy storage medium is configured to change as the piston moves, and a thrust exerted by the piston dependent on the energy storage medium in the saturated vapor pressure state remains substantially constant, and the energy storage structure further comprises at least one heating element configured to heat the energy storage medium arranged within the accommodating cavity.

2. The energy storage structure according to claim 1, wherein:
   the energy storage medium in the accommodating cavity is a supercritical fluid; and
   a density of the energy storage medium is configured to change responsive to a change in an accommodating volume in the accommodating cavity.

3. The energy storage structure according to claim 1, further comprising:
   at least one temperature sensor arranged within the accommodating cavity; and
   at least one pressure sensor arranged within the accommodating cavity.

4. The energy storage structure according to claim 1, wherein the accommodating cavity includes an annular cavity enclosing the piston cylinder part.

5. The energy storage structure according to claim 1, further comprising:
   a piston rod including a plurality of teeth; and
   a return mechanism connected to the piston rod and configured to cause the piston to return to an initial position, wherein:
   the return mechanism includes a gear mechanism;
   the gear mechanism is configured to engage with the plurality of teeth of the piston rod; and
   the return mechanism is configured to drive the piston to return the piston to the initial position by the gear mechanism.

6. An energy storage structure, comprising:
   a housing and a piston,
   wherein an accommodating cavity and a piston cylinder part communicating with each other are arranged within the housing;
   the piston is slidably and sealingly arranged within the piston cylinder part for transmission of impact energy;
   an energy storage medium is arranged within the accommodating cavity; and
   a self-pressure of the energy storage medium is configured to act on the piston, to push and move the piston,
   wherein the energy storage structure further comprises at least one heating element configured to heat the energy storage medium arranged within the accommodating cavity.

7. The energy storage structure according to claim 6, wherein a value of a pressure in the accommodating cavity is equal to a saturated vapor pressure of the energy storage medium.

8. The energy storage structure according to claim 6, wherein:
   the energy storage medium in the accommodating cavity is a supercritical fluid; and
   a density of the energy storage medium is configured to change when an accommodating volume in the accommodating cavity is changed.

9. The energy storage structure according to claim 6, further comprising at least one temperature sensor arranged within the accommodating cavity.

10. The energy storage structure according to claim 6, further comprising at least one pressure sensor arranged within the accommodating cavity.

11. The energy storage structure according to claim 6, wherein the accommodating cavity includes an annular cavity enclosing the piston cylinder part.

12. The energy storage structure according to claim 6, further comprising a return mechanism connected to the piston and configured to make the piston return to an initial position.

13. The energy storage structure according to claim 6, wherein the energy storage medium is a hydrocarbon substance.

14. The energy storage structure according to claim 6, wherein the energy storage medium is a mixture of two or more hydrocarbon substances.

15. The energy storage structure according to claim 6, wherein the energy storage medium includes at least one of carbon dioxide, nitrogen gas, nitrous oxide, ethylene, propylene, trifluoromethane, ammonia gas, methane, or propane.

16. The energy storage structure according to claim 6, wherein the energy storage medium includes a mixture of at least two of carbon dioxide, nitrogen gas, nitrous oxide, ethylene, propylene, trifluoromethane, ammonia gas, methane, or propane.

* * * * *